INVENTOR.
EUGENE B. RAYMOND
BY Edward C. Shredy
HIS ATTORNEY.

United States Patent Office 3,281,816
Patented Oct. 25, 1966

3,281,816
POLARITY PROTECTED BOOSTER CABLE
Eugene B. Raymond, 4041 W. Grove, Skokie, Ill.
Filed Jan. 20, 1964, Ser. No. 338,735
1 Claim. (Cl. 340—249)

My invention relates to a polarity protected booster cable which is used to connect a charging battery to a battery to be charged and has for its principal object the provision of an arrangement of the character hereinafter described which will be highly efficient in use and economical in manufacture.

This application is a continuation-in-part of my prior application, Serial No. 168,963, filed January 26, 1962, now abandoned.

Booster cables are used by mechanics, service station employees, and by automobile owners for connecting a charging battery to a battery which requires charging, such for example, a battery which has been run down and does not possess sufficient power to perform the operations required of it.

One of the several objects of this invention is to prevent operation of the charging battery should the poles of the charging battery not be connected in harmony with the poles of the run-down battery or the battery to be charged.

Yet another object of the invention is the employment of a polarity indicating light and a push button or toggle type switch, the latter of which is manually operated by the operator to complete energization of the indicating light and a power transistor, which light and transistor will be energized upon closing of such switch if the poles of the batteries are connected in harmony.

Other objects will appear hereinafter.

The invention will be best understood by reference to the accompanying drawings showing the preferred form of construction, and in which.

Figure 1:
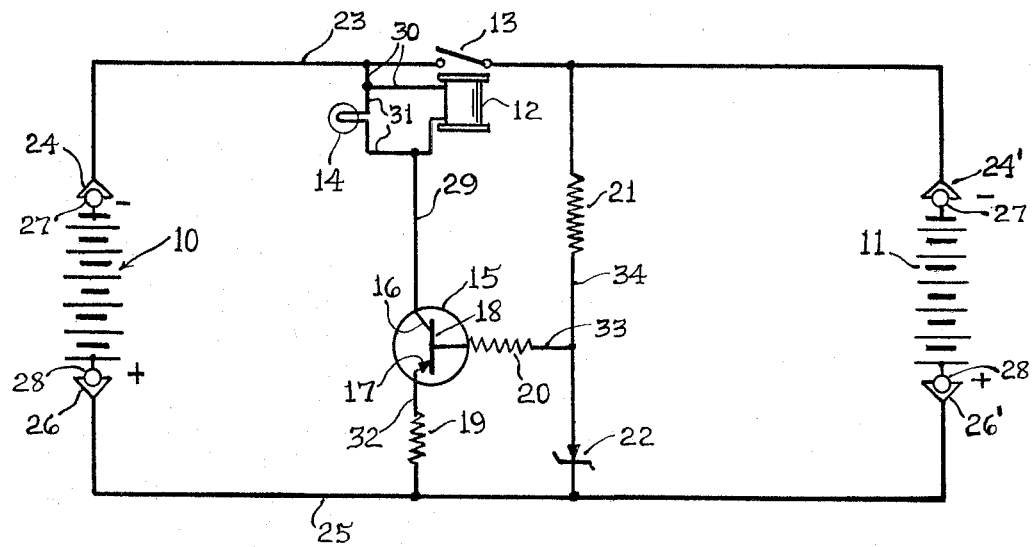
FIG. 1 is a schematic diagram of a circuit embodying the invention.

Referring to FIG. 1, a storage battery, the charging battery, is indicated at 10. A storage battery, the run-down battery or the battery to be charged, is indicated at 11. 12 indicates an electromagnetic coil which activates a switch 13. An indicating light is designated 14. 15 indicates a power transistor having a collector 16, an emitter 17, and a base 18. 19, 20 and 21 indicate, respectively, resistors. A zener diode is indicated at 22. The elements 12 to 22 may be arranged in a suitable casing (not shown) which becomes a part of the booster cable and such elements are arranged in a circuitry in the following manner.

23 is a conductive line having its opposite ends thereof connected to battery clamps 24 and 24'. A second conductive line 25 has its opposite ends connected to battery clamps 26 and 26'. The clamps 24–24' and 26–26' are adapted to be clamped to the negative and positive poles 27 and 28 of the batteries 10 and 11, respectively. The collector 16 of the power transistor 15 by a conductor 29 is connected to one side of the coil 12. The other side of the coil 12 by a conductor 30 is connected to the conductive line 23. The conductive line 23 has incorporated therein the normally open switch 13 which is activated when the coil 12 is energized. Connected in series by conductive lines 31 with the coil 12 is the indicating light 14. The emitter 17 of the power transistor 15 by a conductor 32 is connected to a conductive line 25 and has incorporated therein the resistor 19. The base 18 of the power transistor 15 by a conductor 33 is connected to a conductor 34 and has incorporated therein the resistor 20. The conductor 34 is connected to the conductive lines 23 and 25 and has incorporated therein in series the resistor 21 and the zener diode 22.

The operation of the circuit shown in FIG. 1 is as follows:

The power transistor 15 energizes the electromagnetic coil 12 and the indicating light 14 by controlling the flow of current from the collector 16 to the emitter 17 of the power transistor 15. This is accomplished by controlling the current flowing between the base 18 and the emitter 17 of the power transistor 15. The voltage of the base circuit 18 of the transmitter must be negative with respect to the emitter in order to allow current to flow between the base 18 and the emitter 17. When current flows in this manner, current is allowed to flow in the collector-emitter circuit, with the result that the electromagnetic coil is energized to activate the switch 12.

When the clamps 24–24' and 26–26' are connected to the respective poles 27 and 28 of the battery 11 to be charged, current is allowed to flow through the resistors 20 and 21. Since the positive side is connected to the emitter 17 of the power transistor 15 through the resistor 19, the voltage on the base 18 of the power transistor 15 is negative and the coil 12 is activated to close the switch 13. If the battery to be charged is not connected in proper polarity harmony with the charging battery, the voltage on the emitter 17 is negative and therefore the base of the power transistor 15 is positive with respect to the emitter 17 and the electromagnetic coil 12 becomes inactive.

The purpose of the resistor 19 is to control the current flowing through the emitter 17 of the transistor 15. The resistors 20 and 21 bias the base 18 so as to allow the proper amount of current flow through the base 18 and emitter 17. The purpose of the zener diode 22 is to allow the circuit to be used for either 6 v. or 12 v. batteries. When a 12 v. battery is used, the diode 22 breaks down, that is to say, it allows current to flow through, which produces a certain voltage drop across the resistor 21. This voltage drop is so designed as to permit the proper current to flow through the base 18 and emitter 17. As long as the polarities of the batteries 10 and 11 are connected in harmony, current is permitted to flow from the power transistor to energize the electromagnetic coil 12 and close the switch 13, thus setting in operation the charging of the run-down battery 11 by the battery 10. If, on the other hand, the polarities of the batteries 10 and 11 are not in harmony, current will not flow through the power transistor, with the consequences that the electromagnetic coil 12 will not be energized and the switch 13 will remain open. Whenever the coil 12 is energized, the indicating light 14, being connected in parallel therewith, will likewise be energized to indicate to the operator that the polarities between the batteries 10 and 11 have been connected in harmony.

Figure 2:
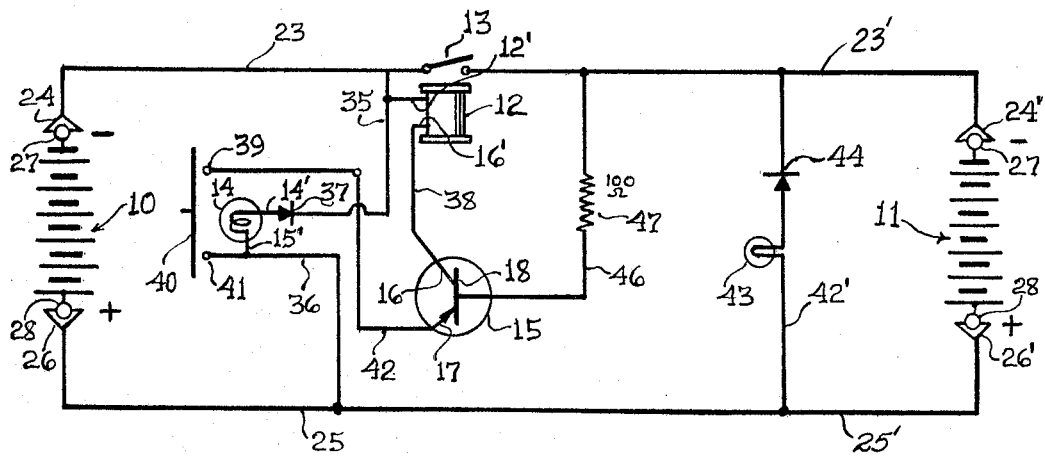
FIG. 2 is a schematic diagram of a circuit embodying the invention but showing a modified form of construction.

In FIG. 2, I have shown the invention in a modified form of circuitry. Elements in the circuit illustrated in FIG. 2 which correspond to elements shown and described in FIG. 1, will be designated by like reference numerals.

In FIG. 2, side 12' of an electromagnetic coil 12, as well as side 14' of the indicating light 14, are by conductor 35 connected to the negative conductive line 23. The opposite side 15' of the indicator light 14 by a conductor 36 is connected to the positive conductive line 25. In the conductor 36 between the coil 12 and light 14, is incorporated a diode 37 which allows a flow of current from the negative conductive line 23 through the conductor 35, diode 37, indicator light 14, conductor 36, to the positive conductive line 25 when the clamps 24 and 26 are connected to the negative pole 27 and positive pole 28, respectively, of the battery 10, thus indicating a proper connection to such battery.

The opposite side 16' of the coil 12 is by a conductor 38 connected to the collector 16 of the power transistor 15. The emitter 17 of the transistor 15 is connected by a conductor 42 to one pole 39 of a manually operated toggle or push button switch 40. The opposite pole 41 of the switch 40 is in turn connected to the conductor 36 which in turn is connected to the positive conductive line 25.

A conductor 42' has connected therein in series an indicator light 43 and a diode 44. The conductor 42' extends between the negative conductive line 23' and the positive conductive line 25' which in turn are adapted to be connected to the negative pole 27 and the positive pole 28 of the battery 11. When such a connection is made, the diode 44 will permit the current to pass from the negative pole 27 of battery 11 through the clamp 24', the negative conductor line 23', diode 44, indicator light 43, conductor 42', the positive conductive line 25', through clamp 26' to the positive pole 28 of the battery 11.

The base of the transistor 15 by a conductor 46 is connected to the negative conductive line 23' and has positioned therein a bias resistor 47 which determines the amount of current flow when the battery poles are connected in harmony as hereinbefore explained.

When the battery poles are connected in harmony, both of the indicator lights 14 and 43 will be lighted. In this condition, when the switch 40 is closed, the coil 12 will be energized, closing the switch 13, permitting the flow of current from battery 10 to battery 11.

In this circuit (FIG. 2), the power transistor 15 operates in the same manner as in the circuit, FIG. 1. It will allow conduction to take place through the collector and emitter if the voltage on the base is negative with respect to the emitter. This is accomplished only if the battery 11 to be charged is connected in proper polarity with the charging battery 10.

The indicating light 14 of the circuit shown in FIG. 2 becomes energized upon connection of the clamps 24–24' and 26–26' to the negative pole 27 and positive pole 28, respectively, of the charging battery 10, the circuit being from the negative pole 27 of the charging battery 10 through the negative conductive line 23 through conductor 35, light 14, conductor 36, diode 37, to the conductive line 25 and thence to the positive pole 28 of the battery 10.

The indicating light 43 of the circuit shown in FIG. 2 becomes energized when the clamp 24' of conductive line 23 and the clamp 26' of conductive line 25 are connected to the negative pole 27 and positive pole 28, respectively, of the battery to be charged, the circuit being from the negative pole 27 of the battery 11, conductive line 23, conductor 42', diode 44, light 43, and thence to the positive pole 28 of the battery 11.

The circuit shown in FIG. 2, as is apparent from the foregoing, employs two indicating lights, each of which is utilized to indicate that proper connections between the conductive lines 23 and 25 have been made with the proper respective poles of the batteries 10 and 11. In other words, while the indicating light 14 will indicate that the conductive lines 23 and 25 are properly connected to the poles of the charging battery 10, the fact that the indicating light 43 is not energized will indicate that the conductive lines 23 and 25 are not connected to the proper poles of the battery 11.

Various elements of the circuit shown in FIG. 2, such for example, the coil 12 and its switch 13, the diode 37, indicating light 14, switch 40, power transistor 15, resistor 47, diode 44, and indicating light 43, all may be incorporated in a suitable control box, which may be disposed at a convenient point between the opposite ends of the negative and positive conductive lines 23 and 25.

From the foregoing description, it will be apparent that I have provided a simple and efficient polarity protected booster cable used to connect a charging battery to a battery to be charged.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim as new and desire to protect by Letters Patent is:

A polarity protected booster cable for connecting a charging battery to a battery to be charged, including
(a) an electromagnetic coil,
(b) a negative conductive line having opposite end portions connected to the negative poles of the batteries and including a normally open switch operable by said electromagnetic coil,
(c) a positive conductive line having opposite ends connected to the positive poles of the batteries,
(d) a pair of indicating lights connected in independent circuits across each battery between the negative conductive line and the positive conductive line, and energized when said negative and positive conductive lines are properly connected to their respective poles of the batteries,
(e) diode means connected in series in each of the independent light circuits for permitting energization of said indicating lights only upon proper connection of said negative and positive conductive lines to the respective poles of said batteries,
(f) a manually operated switch connected in circuit with said electromagnetic coil and adapted to energize said coil to close said normally open switch in said negative conductive line when said cable is properly connected to the respective polarities of the batteries,
(g) a power transistor for preventing energization of said coil by said manually operated switch when said cable is improperly connected to said batteries and at least one of said light circuits is deenergized,
(h) said power transistor having its collector circuit connected to one side of said coil, the other side of said coil being connected to the negative conductive line and one end of one of said independent light circuits,
(i) said power transistor having its emitter side connected to one side of said manually operated switch, with the other side of said manually operated switch connected to the positive conductive line and the other end of said one of said independent light circuits,
(j) and a conductor connecting the base circuit of said transistor to the negative conductive line and one end of the other of said independent light circuits and including therein a resistor to bias said transistor to prevent energization of said coil when said manually operated switch is closed when said negative and positive conductive lines are connected to opposite polarities of either of said batteries.

References Cited by the Examiner

UNITED STATES PATENTS

| | | | |
|---|---|---|---|
| 2,759,142 | 8/1956 | Hamilton | 307—88.5 |
| 2,850,650 | 9/1958 | Meacham | 307—88.5 |
| 3,062,998 | 11/1962 | Medlar | 320—25 X |
| 3,085,187 | 4/1963 | Godshalk | 320—25 |

THOMAS B. HABECKER, *Acting Primary Examiner.*

NEIL C. READ, *Examiner.*

D. K. MYER, *Assistant Examiner.*